(12) United States Patent
Park et al.

(10) Patent No.: US 6,373,879 B1
(45) Date of Patent: Apr. 16, 2002

(54) DEVICE AND METHOD FOR GENERATING SPREAD SPECTRUM SIGNALS

(75) Inventors: Jong-Hyeon Park, Seoul; Je-Woo Kim, Kyonggi-do, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/224,706

(22) Filed: Dec. 31, 1998

(30) Foreign Application Priority Data

Dec. 31, 1997 (KR) .......................................... 97-80590

(51) Int. Cl.[7] .............................................. H04K 1/00
(52) U.S. Cl. ....................................... 375/140; 375/146
(58) Field of Search .................................. 375/130, 140, 375/146, 147, 261, 279, 280, 298, 309, 295, 316, 329, 340; 364/717; 370/203, 206, 208, 342, 320, 335; 332/103, 104; 329/304, 305

(56) References Cited

U.S. PATENT DOCUMENTS

| | | | |
|---|---|---|---|
| 4,538,280 A | * 8/1985 | Mosley, Jr. et al. | 375/130 |
| 4,779,266 A | 10/1988 | Chung et al. | 340/825.64 |
| 5,195,090 A | 3/1993 | Bolliger et al. | 370/314 |
| 5,278,892 A | 1/1994 | Bolliger et al. | 455/442 |
| 5,521,559 A | * 5/1996 | Ichihara | 332/103 |
| 5,577,025 A | 11/1996 | Skinner et al. | 370/342 |
| 5,764,687 A | 6/1998 | Easton | 345/147 |
| 5,831,977 A | 11/1998 | Dent | 375/148 |
| 6,259,755 B1 | * 7/2001 | O'Sullivan et al. | 375/376 |

* cited by examiner

Primary Examiner—Tesfaldet Bocure
(74) Attorney, Agent, or Firm—Robert E. Bushnell, Esq.

(57) ABSTRACT

A circuit and process for generating spread signals using orthogonal codes in a DS-CDMA mobile communication system. The process and circuit contemplate the use of a zero-crossing detector for detecting an I-channel signal and a Q-channel signal to generate a zero-crossing detection signal, a delay for phase-delaying the Q-channel signal by 90°, and a multiplexer for outputting one of the Q-channel signal and the phase-delayed signal according to the zero-crossing detection signal. The multiplexer outputs the Q-channel signal to maintain an orthogonality between the I-channel signal and the Q-channel signal, when the zero-crossing is not detected. When the zero-crossing is detected however, the multiplexer phase-delays the Q-channel signal by 90° and outputs the phase-delayed Q-channel signal to maintain a ½ chip offset. Therefore, the device can minimize phase errors, maintaining an orthogonality between the I-channel signal and the Q-channel signal.

3 Claims, 2 Drawing Sheets

DEVICE AND METHOD FOR GENERATING SPREAD SPECTRUM SIGNALS

CLAIM FOR PRIORITY

This application makes reference to, incorporates the same herein, and claims all benefits accruing under 35 U.S.C. §119 from an application for a patent entitled Device And Method For Generating Spread Spectrum Signals earlier filed on Dec. 31, 1997 in the Korean Industrial Property Office and there duly assigned Serial No. 80590/1997.

BACKGROUND OF THE INVENTION

1. Field of the Invention

The present invention relates to a direct sequence-code division multiple access (i.e., DS-CDMA) mobile communication process and system, and, more particularly, to an offset quadrature phase shift keying (i.e., OQPSK) modulation device and process for generating spread spectrum signals using orthogonal codes.

2. Description of the Related Art

A code division multiple access (i.e., a CDMA) mobile communication system allows many subscribers to share time and frequency. To do so, a transmitter spreads signals is to be transmitted using pseudo-noise (i.e., PN) sequences (or PN codes), having low mutual correlation, allocated to the respective subscribers, and then transmits the spread signals. A receiver then generates the same PN sequences as used in the transmitter to maintain synchronization and despreads the received signals using the generated PN sequences to restore the original signals. An exemplar of one technique for despreading may be found in U.S. Pat. No. 5,577,025 for Signal Acquisition In A Multi-user Communication System Using Multiple Walsh Channels by Gordon Skinner and Brian Harms.

The data rate used by one subscriber is generally much lower than that of a frequency bandwidth. Since data at the low data rate is transmitted through the frequency bandwidth at the high data rate, codes used for distinguishing the subscribers from one another have the properties of the spreading codes. That is, data bit streams at the low data rate are spread by using the spreading codes at the high data rate, and are then transmitted or received through a given frequency bandwidth. As a kind of this CDMA system, a DS-CDMA communication system spreads the data bit streams to be communicated by multiplying the data bit streams by the PN sequences having a code rate higher than that of the data, with the different PN sequences being allocated to the respective subscribers.

Moreover, CDMA mobile communication systems employ a spreading technique for spreading data by using Walsh codes that are spreading codes used for channel separation and spectrum spreading. This spreading technique distinguishes (or separates) the difference subscribers or channels by using the orthogonality of the Walsh codes, without interference among the channels (subscribers). Here, an OQPSK modulation utilizes an offset to maintain the orthogonality.

In one design of an OQPSK modulation device for a DS-CDMA mobile communication system, one finite impulse response filter (i.e., FIR) filters the spread signal XI(t) to generate an I-channel transmission signal SI(t) and another an FIR filter filters the spread signal XQ(t) that has been delayed by one-half of a chip in a ½ chip delay in order to generate a Q-channel transmission signal SQ(t). This design endeavors to prevent zero-crossing of the spread signals XI(t) and XQ(t) by phase-delaying the spread signal XQ(t) by 90°. Therefore, when the FIR-filtered transmission signals SI(t) and SQ(t) are applied to a linear circuit in a rear stage such as a power amplifier, an increase in sidelobe of the transmission signals can be prevented. We have found that unlike a QPSK DS-CDMA communication system not providing an offset, the OQPSK DS-CDMA communication system can not maintain the orthogonality between the I-channel signal XI(t) and the Q-channel signal XQ(t); this results in the occurrence of phase errors. That is, we have noticed that when no channel noise exists during demodulation at the receiver, the orthogonality between the I-channel and the Q-channel is not maintained; this causes phase errors due to mutual interference and thus deterioration of the performance of the system.

SUMMARY OF THE INVENTION

It is therefore an object of the present invention to provide an improved process and circuit for generating spread spectrum signals.

It is another object to provide a process and circuit for generating spread signals using orthogonal codes in a DS-CDMA mobile communication system.

It is still another object to provide a code division multiple access process and circuit able to maintain orthogonality between the I-channel and the Q-channel.

It is yet another object to provide a process and circuit for generating spread signals using orthogonal codes in a DS-CDMA mobile communication system, which can minimize phase errors and maintain an orthogonality between an I-channel signal and a Q-channel signal.

It is still yet another object to provide a process and circuit for generating spread signals using orthogonal codes in an offset quadrature phase shift keying modulated circuit for a direct sequence-code division multiple access communication system amenable to avoidance of zero-crossing.

It is a further object to provide a process and circuit for generating spread signals using orthogonal codes in an offset quadrature phase shift keying modulated circuit for a direct sequence-code division multiple access communication system while minimizing any change in sidelobe by avoiding zero-crossing.

These and other objects may be attained in the practice of the instant invention with a process and circuit for generating spread spectrum signals using orthogonal codes in a CDMA mobile communication system. The device includes a zero-crossing detector for detecting an I-channel signal and a Q-channel signal to generate a zero-crossing detection signal, a delay for phase-delaying the Q-channel signal by 90°, and a multiplexer for outputting one of the Q-channel signal and the phase-delayed signal according to the zero-crossing detection signal. The multiplexer outputs the Q-channel signal to maintain an orthogonality between the I-channel signal and the Q-channel signal, when the zero-crossing is not detected. When the zero-crossing is detected however, the multiplexer phase-delays the Q-channel signal by 90° and outputs the phase-delayed Q-channel signal to maintain an one-half chip offset.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which.

DETAILED DESCRIPTION OF THE PREFERRED EMBODIMENT

Turning now to the drawings, it may be noted that in the specification, well-known functions or constructions which may obscure the invention in unnecessary detail are not described in detail.

Figure 1:
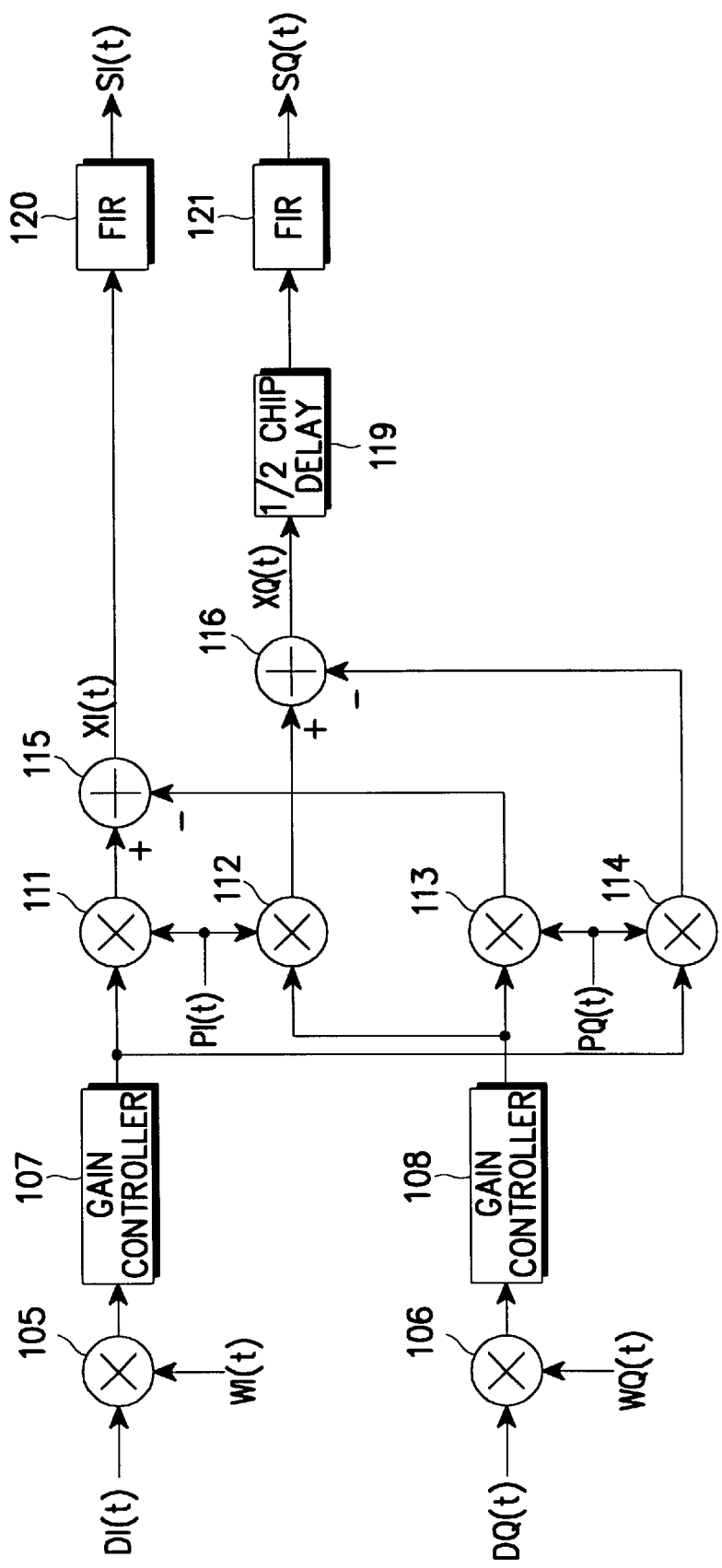
FIG. 1 is a block diagram of a conventional OQPSK modulation device for a DS-CDMA mobile communication system.

FIG. 1 illustrates a block diagram of a conventional OQPSK modulation device for a DS-CDMA mobile communication system. Referring to FIG. 1, orthogonal modulators 105 and 106 orthogonally modulate (or spread) I-channel (or I-arm) input data DI(t) and Q-channel (or Q-arm) input data DQ(t) with orthogonal codes WI(t) and WQ(t), respectively. Walsh codes may be used for the orthogonal codes. The OQPSK modulation device then spreads the orthogonally modulated I- and Q-channel signals output from gain controllers 107 and 108 with PN codes PI(t) and PQ(t), to generate spread signals XI(t) and XQ(t).

Specifically, for generating the I-channel spread signal XI(t), a spreader 111 spreads an output signal of gain controller 107 with the PN code PI(t) and a spreader 113 spreads an output signal of gain controller 108 with the PN code PQ(t). A subtracter 115 then subtracts an output signal of spreader 113 from an output signal of spreader 111 to generate the I-channel spread signal XI(t). Similarly, for generating the Q-channel spread signal XQ(t), a spreader 112 spreads the output signal of gain controller 108 with the PN code PI(t) and a spreader 114 spreads the output signal of gain controller 107 with the PN code PQ(t). A subtracter 116 then subtracts an output signal of spreader 114 from an output signal of spreader 112 to generate the Q-channel spread signal XQ(t).

Subsequently, an FIR (Finite Impulse Response) filter 120 filters the spread signal XI(t) to generate an I-channel transmission signal SI(t), and an FIR filter 121 filters the spread signal XQ(t) which is delayed by ½ chip in a ½ chip delay 119 so as to generate a Q-channel transmission signal SQ(t). The OQPSK DS-CDMA communication system described in the foregoing paragraphs endeavors to prevent zero-crossing of the spread signals XI(t) and XQ(t) by phase-delaying the spread signal XQ(t) by 90°. Therefore, when the FIR-filtered transmission signals SI(t) and SQ(t) are applied to a linear circuit in a rear stage such as a power amplifier, an increase in sidelobe of the transmission signals can be prevented.

Unlike a QPSK DS-CDMA communication system not providing an offset, a OQPSK DS-CDMA communication system can not maintain the orthogonality between the I-channel signal XI(t) and the Q-channel signal XQ(t), thereby causing phase errors. That is, when no channel noise occurs during demodulation at the receiver, the orthogonality between the I-channel and the Q-channel is not maintained, which results in the phase errors due to mutual interference and thus deteriorates the system performances.

Figure 2:
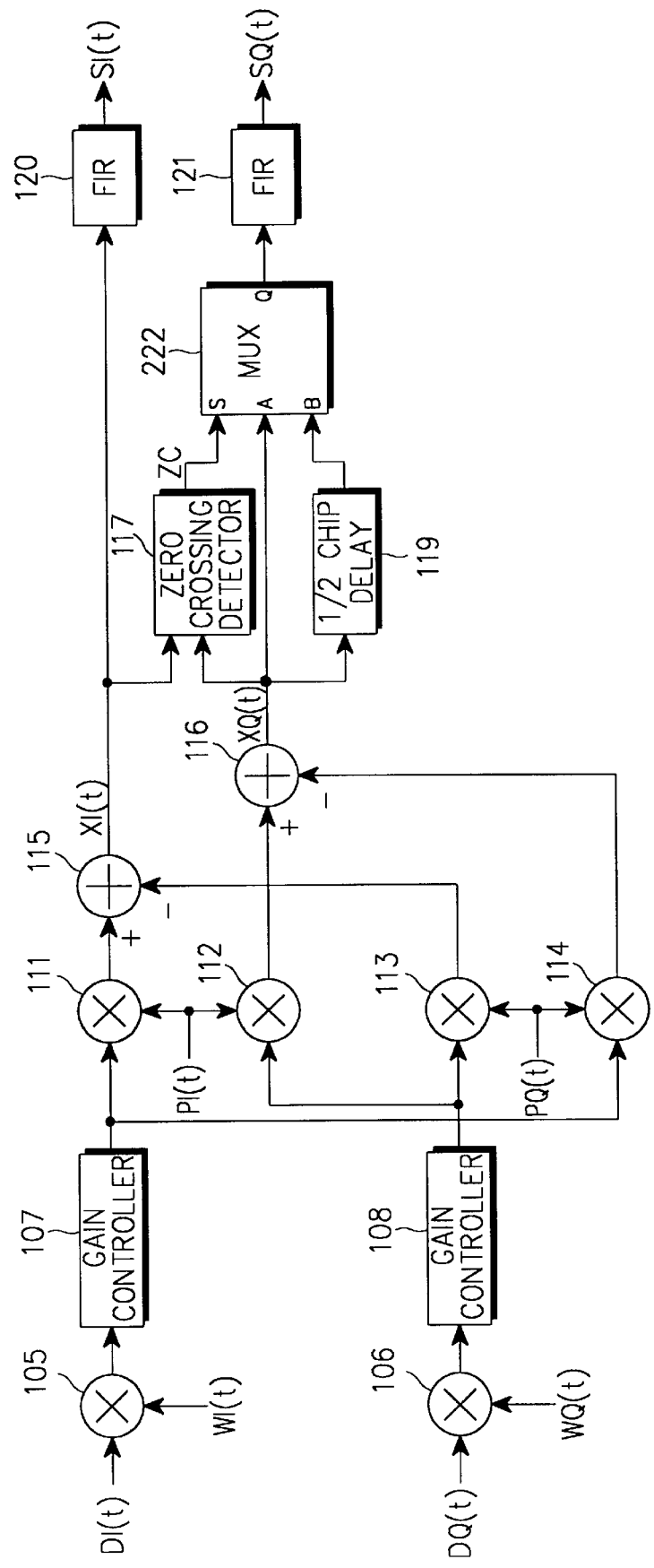
FIG. 2 is a block diagram of an OQPSK modulation device for a DS-CDMA mobile communication system constructed as an embodiment of the present invention.

FIG. 2 illustrates a block diagram of preferred embodiment of the present invention with an OQPSK modulation device for a DS-CDMA mobile communication system constructed according to the principles of the present invention. The OQPSK modulation device illustrated by FIG. 2 is superficially similar in structure to the conventional O-QPSK modulation device of FIG. 1, except that the circuit illustrated by FIG. 2 includes a zero-crossing detector 117 and a multiplexer 118. Zero-crossing detector 117 detects zero-crossing of the I- and Q-channel spread signals XI(t) and XQ(t) and generates a zero-crossing detection signal ZC according to the detection results. Multiplexer 118 receives the Q-channel spread signal XQ(t) at an input node A and the 90° phase-delayed spread signal XQ'(t) (i.e., ½ chip-delayed signal) at another input node B. The multiplexer 118 selectively outputs the spread signal XQ(t) and the 90° phase-delayed spread signal XQ'(t) according to the zero-crossing detection signal ZC.

In operation, orthogonal modulators 105 and 106 orthogonally modulate (or spread) the I-channel input data DI(t) and the Q-channel input data DQ(t) with the orthogonal codes WI(t) and WQ(t), respectively. The device then spreads the orthogonally modulated I- and Q-channel signals with PN codes PI(t) and PQ(t), to generate spread signals XI(t) and XQ(t).

Specifically, for generating the 1-channel spread signal XI(t), spreader 111 spreads an output signal of gain controller 107 with the PN code PI(t) and spreader 113 spreads an output of gain controller 108 with the PN code PQ(t). Subtracter 115 then subtracts an output signal of spreader 113 from an output signal of spreader 111 to generate the spread signal XI(t). Similarly, for generating the Q-channel spread signal XQ(t), spreader 112 spreads the output signal of gain controller 108 with the PN code PI(t) and spreader 114 spreads the output signal of gain controller 107 with the PN code PQ(t). Subtracter 116 then subtracts an output signal of spreader 114 from an output signal of spreader 112 to generate the spread signal XQ(t).

Subsequently, FIR filter 120 filters the spread signal XI(t) to generate an I-channel transmission signal SI(t). Zero-crossing detector 117 detects the zero-crossing of the spread signals XI(t) and XQ(t). Here, when the zero-crossing is not detected, multiplexer 118 outputs the spread signal XQ(t) from subtracter 116 according to zero-crossing detection signal ZC (so that device acts as QPSK modulation device). When zero-crossing is detected however, multiplexer 118 outputs phase-delayed spread signal XQ'(t) output from ½ chip delay 119 according to the zero-crossing detection signal ZC (so that the device acts as the OQPSK modulation device). In this manner, when there occurs the zero-crossing between the spread signals XI(t) and XQ(t), the device OQPSK-modulates the I-channel signal and the Q-channel signal to maintain the ½ chip offset between the I-channel signal XI(t) and the Q-channel signal XQ(t), thereby preventing the zero-crossing between the I-channel transmission signal SI(t) and the Q-channel transmission signal SQ(t). On the contrary, when there does not occur the zero-crossing between the spread signals XI(t) and XQ(t), the device QPSK-modulates the spread signals XI(t) and XQ(t) to maintain the orthogonality between the I-channel signal XI(t) and the Q-channel signal XQ(t), thus minimizing the phase errors.

Specifically, zero-crossing detector 117 checks whether there occurs the zero-crossing of the spread signals XI(t) and XQ(t) and generates the detection signal ZC of "0" when the zero-crossing is not detected, so as to enable the device to act as the QPSK modulation device. That is, the multiplexer 118 outputs the spread signal XQ(t) input at the input node A thereof in response to the zero-crossing detection signal ZC. As a result, the FIR filter 120 filters the spread signal XI(t) to generate the transmission signal SI(t) and the FIR filter 121 filters the spread signal XQ(t) to generate the transmission signal SQ(t).

However, upon detection of the zero-crossing, the zero-crossing detector 117 outputs the zero-crossing signal of "1", so as to enable the device to act as the OQPSK modulation device. That is, the multiplexer 118 outputs the ½ chip-delayed spread signal XQ'(t) input at the input node B thereof in response to the zero-crossing detection signal ZC. As a result, the FIR filter 120 filters the spread signal XI(t) to generate the transmission signal SI(t) and the FIR filter 121 filters the ½ chip-delayed spread signal XQ'(t) to generate the transmission signal SQ(t).

As described above, the OQPSK DS-CDMA system of the invention prevents the zero-crossing and minimizes the increase in the sidelobe, thereby improving the system performance against the phase errors due to non-orthogonality between the I-channel signal and the Q-channel signal, which is a shortcoming of the OQPSK system. That is, the invention system can minimize the phase errors by maintaining the orthogonality between the I-channel signal and the Q-channel signal.

The foregoing paragraphs describe the details of a process and circuit for generating spread signals using orthogonal codes in a DS-CDMA mobile communication system. The process and circuit contemplate the use of a zero-crossing detector for detecting an I-channel signal and a Q-channel signal to generate a zero-crossing detection signal, a delay for phase-delaying the Q-channel signal by 90°, and a multiplexer for outputting one of the Q-channel signal and the phase-delayed signal according to the zero-crossing detection signal. The multiplexer outputs the Q-channel signal to maintain an orthogonality between the I-channel signal and the Q-channel signal, when the zero-crossing is not detected. When the zero-crossing is detected however, the multiplexer phase-delays the Q-channel signal by 90° and outputs the phase-delayed Q-channel signal to maintain a ½ chip offset. Therefore, the device can minimize phase errors, maintaining an orthogonality between the I-channel signal and the Q-channel signal. While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A device for generating spread spectrum signals using orthogonal codes in a CDMA (Code Division Multiple Access) mobile communication system, said device comprising:

a zero-crossing detector for detecting an I-channel signal and a Q-channel signal to generate a zero-crossing detection signal;

a delay for phase-delaying the Q-channel signal by 90°; and a multiplexer receiving the Q-channel signal at an input node and said phase-delayed signal at another input node, for outputting one of the Q-channel signal and the phase-delayed signal according to the zero-crossing detection signal.

2. A method for generating spread spectrum signals using orthogonal codes in a CDMA mobile communication system, said method comprising the steps of:

determining whether there occurs zero-crossing of an I-channel signal and a Q-channel signal;

outputting the Q-channel signal to maintain an orthogonality between the I-channel signal and the Q-channel signal, when the zero-crossing is not detected; and phase-delaying the Q-channel signal by 90° and outputting said phase-delayed Q-channel signal to maintain a ½ chip offset, when the zero-crossing is detected.

3. A method for generating spread spectrum signals using orthogonal codes in a CDMA mobile communication system, said method comprising the steps of:

determining whether there occurs zero-crossing of an I-channel signal and a Q-channel signal to generate a zero-crossing detection signal;

phase-delaying the Q-channel signal by 90°; and outputting one of the Q-channel signal the phase-delayed signal according to the zero-crossing signal.

* * * * *